(12) United States Patent
Twitty et al.

(10) Patent No.: US 12,651,532 B2
(45) Date of Patent: *Jun. 9, 2026

(54) SYSTEMS AND METHODS FOR MANAGING COMMUNICATIONS BETWEEN VEHICLES

(71) Applicant: Peloton Technology, Inc., Pacific Grove, CA (US)

(72) Inventors: Colleen Twitty, San Francisco, CA (US); Evan Nakano, Cupertino, CA (US); Stephen Erlien, Mountain View, CA (US); Joshua Switkes, Mountain View, CA (US)

(73) Assignee: Peloton Technology, Inc., Pacific Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,653

(22) Filed: Nov. 30, 2023

(65) Prior Publication Data

US 2025/0246080 A1      Jul. 31, 2025

Related U.S. Application Data

(60) Continuation of application No. 17/751,523, filed on May 23, 2022, now Pat. No. 11,875,686, which is a continuation of application No. 17/008,443, filed on Aug. 31, 2020, now Pat. No. 11,341,856, which is a division of application No. 16/173,908, filed on Oct. 29, 2018, now Pat. No. 10,762,791.

(51) Int. Cl.
*G08G 1/00* (2006.01)
*G05D 1/00* (2006.01)
(Continued)

(52) U.S. Cl.
CPC ............. *G08G 1/22* (2013.01); *G05D 1/0289* (2013.01); *G05D 1/0293* (2013.01); *G05D 1/0295* (2013.01); *G05D 1/69* (2024.01); *G05D 1/693* (2024.01); *G05D 1/695* (2024.01); *H04W 4/023* (2013.01); *H04W 76/14* (2018.02); *H04W 76/30* (2018.02)

(58) Field of Classification Search
CPC ............ G08G 1/22; G05D 1/69; G05D 1/693; G05D 1/695; H04W 4/023; H04W 76/14; H04W 76/30
USPC .......................................................... 701/1
See application file for complete search history.

(56) References Cited

U.S. PATENT DOCUMENTS

| | | | | |
|---|---|---|---|---|
| 2010/0256852 A1* | 10/2010 | Mudalige | ................. | G08G 1/22 701/24 |
| 2013/0024084 A1* | 1/2013 | Yamashiro | .......... | B60W 30/165 701/96 |

(Continued)

*Primary Examiner* — Muhammad Shafi
(74) *Attorney, Agent, or Firm* — Redbrick IP, P.C.

(57) ABSTRACT

Systems and methods for increasing the efficiency of vehicle platooning systems are described. In one aspect, drivers are more likely to enjoy a system if it begins platooning as desired and does not accidently end platoons. When a certain amount of data packets sent between vehicles are dropped, systems typically will either not engage in a platoon or end a current platoon. When a platoon has a very small gap between vehicles, the platoon should end—or not start, when a certain amount of packets are dropped. However, if a gap is large enough to provide a driver with more time to react, a system may accept a greater amount of dropped packets before it refuses to start a platoon or causes the end of a platoon.

14 Claims, 14 Drawing Sheets

(51) Int. Cl.

| | | |
|---|---|---|
| *G05D 1/69* | (2024.01) | |
| *G05D 1/693* | (2024.01) | |
| *G05D 1/695* | (2024.01) | |
| *H04W 4/02* | (2018.01) | |
| *H04W 76/14* | (2018.01) | |
| *H04W 76/30* | (2018.01) | |

(56) References Cited

U.S. PATENT DOCUMENTS

| | | | | |
|---|---|---|---|---|
| 2013/0030606 A1* | 1/2013 | Mudalige | G05D 1/0295 | 701/2 |
| 2013/0080041 A1* | 3/2013 | Kumabe | G05D 1/0278 | 701/117 |
| 2013/0211624 A1* | 8/2013 | Lind | G08G 1/22 | 701/2 |
| 2013/0317676 A1* | 11/2013 | Cooper | G01N 29/265 | 701/20 |
| 2014/0303870 A1* | 10/2014 | Switkes | G05D 1/0295 | 701/96 |
| 2014/0309836 A1* | 10/2014 | Ollis | G01C 21/00 | 701/25 |
| 2015/0153733 A1* | 6/2015 | Ohmura | G05D 1/0061 | 701/23 |
| 2015/0251676 A1* | 9/2015 | Golden | B61L 27/0038 | 701/19 |
| 2016/0267796 A1* | 9/2016 | Hiroma | H04L 67/12 | |
| 2017/0363430 A1* | 12/2017 | Al-Dahle | G01C 21/3415 | |

* cited by examiner

400B

510A

520B

510B

520B

900A

900B

1000B

ESTALISH A WIRELESS LINK BETWEEN A FIRST VEHICLE AND A SECOND VEHICLE — 1050

ASSESS THE QUALITY OF THE COMMUNICATION LINK WITH ONE OR MORE METRICS — 1052

PERFORM AN ACTION BASED ON THE ASSESSED QUALITY OF THE COMMUNICATION LINK — 1054

Computer System
1100

Processor
1102

Monitor
1112

Keyboard
1108

Memory
1104

Mouse
1110

Bus
1116

Storage
1106

Network Adapter
1118

Network
1117

SYSTEMS AND METHODS FOR MANAGING COMMUNICATIONS BETWEEN VEHICLES

CROSS-REFERENCE TO RELATED APPLICATIONS

This application is a continuation of co-pending U.S. patent application Ser. No. 17/751,523, entitled "SYSTEMS AND METHODS FOR MANAGING COMMUNICATIONS BETWEEN VEHICLES," filed May 23, 2022, including inventor(s) Colleen Twitty, now U.S. Pat. No. 11,875,686. U.S. application Ser. No. 17/751,523 is a continuation of U.S. patent application Ser. No. 17/008,443, entitled "SYSTEMS AND METHODS FOR MANAGING COMMUNICATIONS BETWEEN VEHICLES," filed Aug. 31, 2020, now U.S. Pat. No. 11,341,856. U.S. patent application Ser. No. 17/008,443 is a divisional of U.S. patent application Ser. No. 16/173,908, entitled "SYSTEMS AND METHODS FOR MANAGING COMMUNICATIONS BETWEEN VEHICLES," filed Oct. 29, 2018, now U.S. Pat. No. 10,762,791. The disclosures of the foregoing applications are incorporated by reference herein in their entireties.

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable and economical at least semi-automated vehicular convoying/platooning systems which enable vehicles to follow closely together in safe, efficient, and convenient manner.

Moreover, it is important to provide users with a pleasant user experience, particularly because drivers may not favor using the methods and systems described herein if they do not enjoy using them. As such, systems that do not cause unnecessary faults are needed in the art.

SUMMARY

The systems and methods comprising various aspects of the disclosure described herein provide for more efficient management of multiple vehicles. For example, without limitation, aspects of the present invention include establishing a communication link between one or more vehicles to aid in safe and efficient following, such as attempting to begin a platoon (e.g., start a draw-in portion of a platooning engagement). The quality of this communication may be measured in many ways, and actions taken based on that measurement. For example, based on an amount of packets being transmitted and received being over a particular amount, a platooning engagement may begin (e.g., a draw-in may start) or a platooning engagement may continue (e.g., a steady-state of platooning may continue). If an amount of packets being transmitted are below a particular amount, an adverse action may occur. An adverse action may include preventing a draw-in from occurring (or stopping a draw-in that is currently in progress), or starting a dissolve portion of a platooning engagement (e.g., if a platoon is in a steady-state). How many packets need to be transmitted successfully/may be dropped (e.g., a packet-loss threshold) can depend on a gap (e.g., a distance/headway) between two vehicles.

As another example, without limitation, aspects of the present invention include establishing a wireless link between a first vehicle and a second vehicle, and attempting to start a draw-in portion of a platooning engagement between the first vehicle and the second vehicle. In response to receiving a first amount of packets over the wireless link at a first location, a first action may occur. A first action may include: (1) causing the first vehicle and the second vehicle to start a draw-in portion of a platooning engagement; (2) continuing a steady state portion of a platooning engagement; (3) causing the first vehicle and the second vehicle to not start a draw-in portion of the platooning engagement; or (4) starting a dissolve portion of a platooning engagement. In response to receiving a second amount of packets over the wireless link at a second location, a second action may occur. A second action may include: (1) causing the first vehicle and the second vehicle to start a draw-in portion of a platooning engagement; (2) continuing a steady state portion of a platooning engagement; (3) causing the first vehicle and the second vehicle to not start a draw-in period of a platooning engagement; or (4) starting a dissolve portion of a platooning engagement.

It will be appreciated by those skilled in the art that the various features of the present disclosure can be practiced alone or in combination.

Further, more, or fewer, actions may be performed with reference to systems and methods described herein.

These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
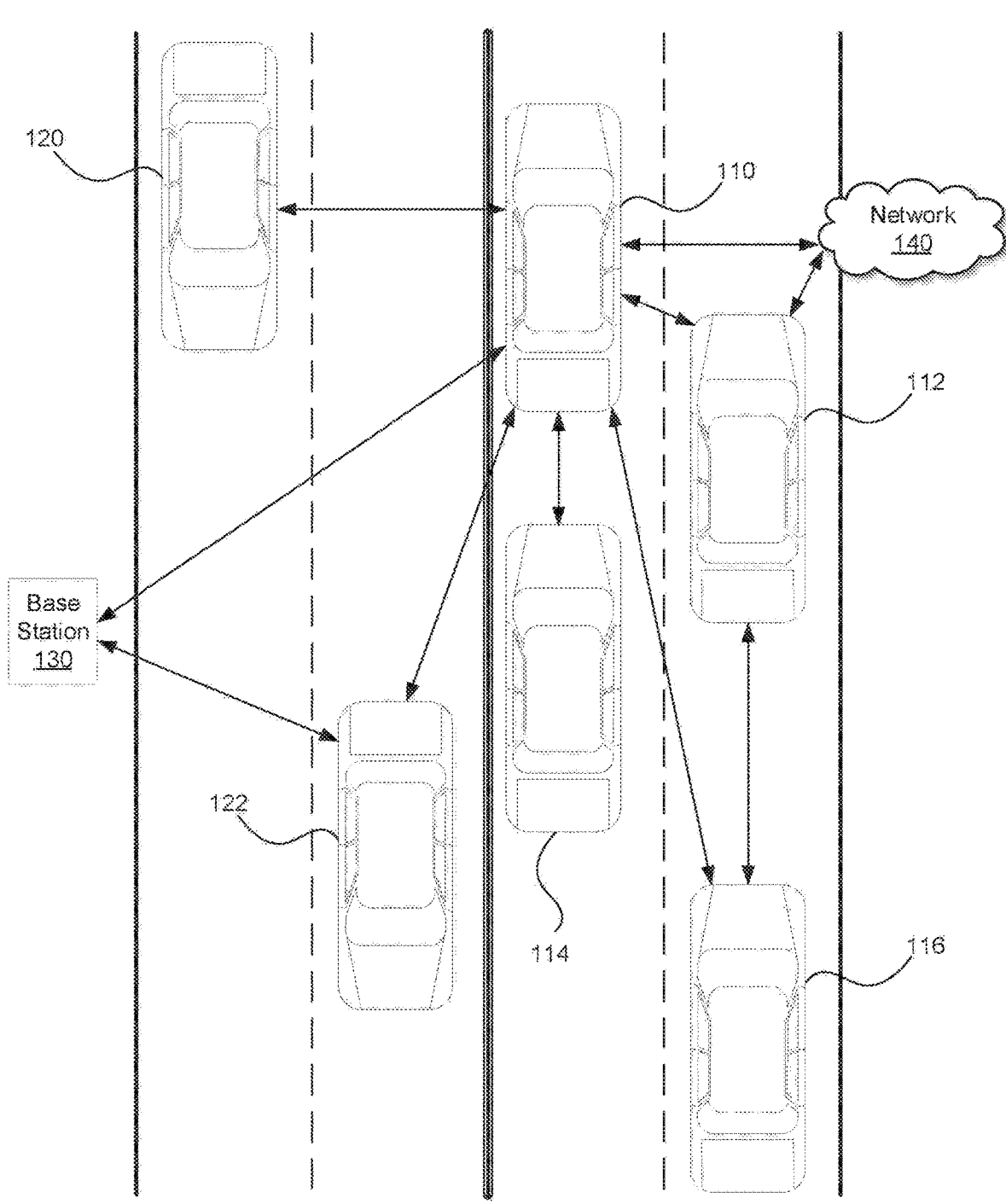
FIG. 1 illustrates a diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practice without implementing all of the features disclosed herein. Further, although many embodiments included in the instant application are related to the concept of platooning, it should be appreciated that many broader applications are envisioned.

Without limitation, the Applicant has proposed various vehicle platooning systems in which a second, and potentially additional, vehicle(s) is/are automatically, or semi-automatically controlled to closely follow a lead/front vehicle in a safe manner. By way of example, U.S. patent application Ser. Nos. 15/605,456, 15/607,902; 13/542,622 and 13/542,627; U.S. Provisional Patent Application Nos. 61/505,076, 62/377,970 and 62/343,819; and PCT Patent Application Nos. PCT/US2014/030770, PCT/US2016/049143, PCT/US2018/41684, and PCT/US2016/060167 describe various vehicle platooning systems in which a trailing vehicle (also referred to herein as a rear vehicle) is at least partially automatically controlled to closely follow a designated lead vehicle. Each of these earlier applications are incorporated herein by reference.

One of the goals of platooning is typically to maintain a desired position between the platooning vehicles and/or a desired relative speed and/or time headway (e.g., a gap may refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (distance/headway), staying at a gap, and/or keeping at least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate. It should be appreciated that herein, a gap may refer to a distance, a time headway, or either.

As described herein, the concept of platooning, also known as convoying, is still in its infancy. Academics have toyed with the concept over the last few decades, but to date there are no commercial systems on the road where a vehicle is at least partially controlled by another vehicle via a vehicle-to-vehicle connection (V2V). The benefits provided by such systems are obvious. Namely, the safety provided by these systems is far greater than a system where a rear vehicle doesn't begin to slow down until its radar or LIDAR sensors determine that a lead vehicle is slowing down, such as with some adaptive cruise control systems. Further, by being able to follow another vehicle at a close distance, in some cases both a rear vehicle and a front vehicle may experience significant fuel savings.

As platoonable vehicles (e.g., vehicles capable of platooning) begin to roll out of the labs and into commercial production, their adoption faces significant challenges. For example, while OEMs and freight companies may greatly desire to have their drivers employ platooning systems, their drivers may only use platooning systems if the system is at least pleasant. For example, a system that dissolves platoons more frequently than other systems-particularly when not needed-may be less desirable to drivers.

A key to these technologies is the communication between the vehicles. This communication enables functionality that would not be safe or effective without the communication. As such, the system may be designed to take into account the quality of the communication link. Some communication links split the communication into packets, which each contain a defined amount of information. In this application we largely discuss packets, but to one skilled in the art, elements of this invention related to packets can be extended to other communication methods that do not explicitly include packets For example, in some embodiments, a platoon may dissolve when a vehicle is not receiving a threshold amount of packets. This might occur because when a rear vehicle is following a front vehicle at ten meters, a certain amount of dropped packets could be unsafe and therefore the platoon may dissolve. But, in some embodiments, a rear vehicle may be able to tolerate greater packet loss if it is further away from a front vehicle, because safety may not be as critical at larger distances, or at least a driver/system may have more time to react.

In other words, having a fixed amount of dropped packets cause a platoon to dissolve-regardless of the distance between a front vehicle and a rear vehicle-may cause an unpleasant user experience due to unnecessary dissolves. Thus, adjusting an acceptable amount of dropped packets to maintain a platoon may be preferable to drivers by allowing for fewer dissolves.

Various methods and systems described herein discuss packet loss tolerances. For the ease of reading, in some embodiments herein, platooning may be described as an engagement that comprises three phases: (1) a draw-in portion (e.g., a first portion of a platooning engagement wherein a gap between a first vehicle and a second vehicle is reduced (e.g., to 10 meters)); (2) a steady-state portion (e.g., a portion of a platooning engagement wherein the first vehicle and the second vehicle are neither drawing-in nor dissolving (e.g., wherein a desired gap is maintained as both vehicles are traveling, such as 10 meters); and (3) a dissolve portion (e.g., a portion of a platooning engagement wherein a gap between a first vehicle and a second vehicle grows and the platooning engagement ends).

Herein, and adverse action may occur to platoonable vehicles such as an unplanned dissolve (e.g., one that is not initiated by a driver/operator) and/or a failure to draw-in (e.g., end a platooning engagement by dissolving and/or not enter/start a draw-in portion of a platooning engagement) based on (1) a system dropping a certain amount of packets, and (2) a distance between two vehicles in a platoon. As described above, the amount of packets a system may drop before an adverse action occurs may be based at least in part on the distance between the two vehicles in the platoon. For instance, if an amount of packets dropped is above a threshold amount, and a distance between two platoonable vehicles is below a threshold amount, an adverse action may occur. As an example, in response to a rear vehicle losing 10 packets out of every 20 packets, while being within 10 meters of a front vehicle, a system may perform an adverse action. As another example, if a rear vehicle is losing 10 packets out of every 20 packets, when being 200 meters behind a front vehicle, a system may refrain from performing an adverse action.

In some embodiments, dropped packets may refer to packets that have timed out. For example, packets that have timed out may include those that weren't received within a threshold amount of time, but may have been received. In some embodiments herein, the corrupted packets may be used interchangeably with dropped packets. This is for the ease of writing/reading this application, and because whether dropped or corrupted, the packets are still essentially unusable. Thus, herein, dropped packets may also refer to unusable corrupted packets. In some embodiments described herein, thresholds associated with bins/amounts of packet losses may be greater or smaller based on whether a vehicle is near interference that may cause packet loss such as being near an airport, another platooning vehicle, an electric line, etc.

In some embodiments "bins" may exist. Data binning may be a form of quantization, wherein original data values which fall into a given interval (e.g., a bin) are replaced by a value representative of that interval. For example, if a rear vehicle is a particular distance away from a front vehicle, it may be classified into one of three (or more) bins. For example, if a rear vehicle is between 0 and 13 meters behind a front vehicle, the distance the rear vehicle is behind the front vehicle may be considered to be within a first bin (e.g., a threshold, a range). Similarly, if a rear vehicle is between 13 and 30 meters behind a front vehicle, the distance the rear vehicle is behind the front vehicle may be considered to be within a second bin (e.g., a threshold, a range). In the same vein, if a rear vehicle is over 30 meters behind a front vehicle, the distance the rear vehicle is behind the front vehicle may be considered to be within a third bin (e.g., a threshold, a range, being greater than a threshold distance)). Of course, it should be understood by one of skill in the art that a distance may also refer to a headway (e.g., 1.5 seconds).

In various embodiments, based on a bin a vehicle's distance falls into, a certain amount of packet loss will be tolerated. For example, if the distance between a rear vehicle and a front vehicle falls within a first bin, then a low amount of packet loss may be acceptable (e.g., before a platoon is dissolved and/or a draw-in may be disallowed). If the distance between a rear vehicle and a front vehicle falls within a second bin, then a larger amount of packet loss may be acceptable because a system and/or operator may have more time to react to unexpected situations than if the rear vehicle were very close to the front vehicle. Similarly, if the distance between a rear vehicle and a front vehicle falls within a third bin, then an even larger amount of packet loss may be acceptable.

In some embodiments a redundant system may be in place to that determines packet loss vis-√†-vis distance between vehicles, which in turn may determine whether to cause a first vehicle and a second vehicle to (1) continue/start a draw-in portion of a platooning engagement; (2) continue a steady-state portion of a platooning engagement; (3) not complete/not start a draw-in portion of a platooning engagement (an adverse action); and/or (4) enter/start a dissolve portion of a platooning engagement (an adverse action).

A redundant system may have two modules. For example, a redundant system may include two or more modules (or locations) that determine an amount of packet loss and a distance between two vehicles, which in some cases may occur independently of each other. In various cases, one module may unpack packets and/or determine safety-critical information (e.g., a distance between vehicles and/or whether a front vehicle is braking) as well as performing actions described herein (e.g., determining a distance vis-√†-vis an amount of packet loss and based on that information determining an action to perform such as dissolving). In some cases, another module may be used to unpack packets and/or determine non-safety-critical information (e.g., video information, traffic information, audio information) as well as performing actions described herein (e.g., determining a distance vis-√†-vis an amount of packet loss and based on that information determining an action to perform such as dissolving).

In some embodiments, one or more of the modules may receive a distance between two or more vehicles and/or an amount of packet loss from one or more devices such as a radar, LIDAR, transceiver (e.g., a DSRC receiver), etc. The redundant modules may reside within one enclosure or be at least partially separated such that each is within a different enclosure (e.g., at least a portion of one of the modules performs operations within a second enclosure). Similarly, redundant modules may exist on one chip, or be at least partially separated more than one chip. For example, one module may be located/executed on a first chip with high integrity chip and/or low performance while another module may be located/executed on a second chip with lower integrity and higher performance relative to the first chip. In some embodiments one module may be running on an ARM-based chip while the other module is not. In some embodiments, one module may be running in a Linux environment while the other module is not. Moreover, redundant modules may exist on one or more circuit board, or may be at least partially separated by more than one circuit board. Of course, additional methods of performing redundant methods as described herein should be understood by one skilled in the art.

As discussed, in some embodiments two or more modules (which may be interchangeably referred to as two or more systems) may exist for redundancy and safety purposes. In some embodiments, a number of bins, and an acceptable amount of packet loss per bin may be the same across the two or more systems. In some embodiments, however, a number of bins, the size (e.g., a distance range/gap amount) of the bins, and/or an acceptable amount of packet loss may be different across modules. Similarly, an unacceptable amount of packet loss (e.g., an amount of packet loss at a certain distance that may cause an adverse action such as preventing a draw-in portion of a platooning engagement or causing a dissolve) may be different between two or more modules.

As an example, in some embodiments a first module may sort distances into four bins (e.g., a first bin corresponding to a 0-10-meter gap, a second bin corresponding to a 10-20-meter gap, a third bin corresponding to a 20-30-meter gap, and a fourth bin corresponding to a gap over 30 meters). A second module may sort distances into 3 bins (e.g., a first bin corresponding to a gap 0-13-meter gap and/or 0-1 seconds, a second bin corresponding to 13-26-meter gap and/or 1-2 seconds, and a third bin corresponding to a gap over 26 meters and or 2+ seconds). If a certain amount of packet loss occurs at 12 meters (e.g., one out of ten packets are lost), then one or both modules may cause a dissolve due to the certain amount of packet loss occurring within the second bin of the first module and/or the first bin of the second module. In some embodiments, a certain amount of packet loss may be acceptable for one module at a certain distance, and unacceptable for another module at a certain distance. Moreover still, in some embodiments, different amounts of packet loss (e.g., at various distances) may be acceptable if a vehicle is entering a draw-in portion of a platooning engagement, and be unacceptable (e.g., prevented, disallowed) if a vehicle is in a steady-state portion of a platooning engagement (or vice-versa). Additionally, in some embodiments, more than two vehicles may perform actions in response to an amount of packet loss vis-√†-vis a distance between one or more vehicles. For example, an adverse action may occur with respect to two, three, or more vehicles in response to various amounts of packet loss between a first (e.g., front), second (e.g., rear and front), and at least a third (e.g., rear) vehicles.

In addition, in some embodiments, a size of a bin and/or an acceptable amount of packet loss (e.g., an amount of packet loss that does not cause an adverse action) may depend on various factors such as a type of communication protocol used to send packets, a geographical location of one or more vehicles, and other factors (which may include vehicle attributes) including, but not limited to a/an: type of vehicle, vehicle class, vehicle position, latitude, longitude, altitude, heading, speed, longitudinal and lateral acceleration, relative angle, type of load (e.g., type of materials a vehicle is carrying), load (e.g., how a vehicle is loaded and/or where a center of gravity of a vehicle is), a load history (e.g., how a vehicle has been loaded in the past and/or types of loads a vehicle has transported), position in a platoon, historical information of platooning travel, historic driver performance, driver performance, driver behavior, historic driver behavior, turn-by-turn navigation, brake status, brake pressure, brake system, version of a brake system, path history, path projection, travel plans, vehicle size, vehicle type, brake type, current operating mode (autonomous or manual), map data, traffic information, GPS augmentation information (e.g., delays from infrastructure), maximum speed, wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, amount of fuel currently being used (e.g., amount of fuel used per amount of time and/or distance), amount of fuel being saved, amount of money being saved by platooning, average amount of money being saved by platooning, historical fuel usage, historical amount of money being saved by platooning, trailer position, current trailer position, past trailer position, tractor type, tractor height, transceiver type, current amount of fuel, previous amount of fuel, vehicle health, next determined/planned stop, projected miles remaining until fuel tanks are empty, malfunctions, turn signals, LIDAR, radar, ultrasonic sensors, road surface, wheel angle, tire pressure, tire tread depth, cabin temperature, engine temperature, trailer interior temperature, camera, fleet of vehicles, NOC that a vehicle can communicate with, computer vision, other vehicle traveling in the same direction, other vehicle traveling in an opposite direction, speed/acceleration/deceleration a vehicle in front of the vehicle is traveling, and intervening traffic (e.g., cut-ins, also referred to as the situation when a vehicle enters an area between a lead vehicle and a rear vehicle causing a dissolve).

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140.

In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

In various embodiments, vehicles 110, 112, 114, 116, 120, and 122 may be configured to platoon, and may platoon with one another. In some embodiments, vehicles may transmit and/or receive data (e.g., to a NOC and/or fleet management system, etc.) including, but not limited to data indicating: whether they are available to platoon; whether they are platooning; whether a platoon they were part of dissolved; what direction they are traveling; what direction they are predicted (e.g., predetermined/planning on/suggested) to be traveling on for a particular period of time; when they are expected to stop (e.g., predetermined to stop, planning on stopping, suggested stopping time); where they plan on stopping; what route(s) they plan to travel (e.g., a route suggested and/or determined by a system, a route determined by a navigation/mapping system based on their destination such a system may be a rendezvousing system, a fleet management system, a navigation system, etc.); what type of platooning system they are equipped with; how many hours they have been on the road; weather they are capable of following the leader (e.g., if one or more vehicles can platoon without a driver); whether they are capable of being the leader in a follow-the-leader system; whether the vehicle is fully autonomous (e.g., capable of level 4 according to the SAE classification system); how much fuel they have saved; how much money they have saved; an area they are allowed to travel within; an area they are not allowed to travel outside of; whether they are capable of platooning on city streets; whether they are only capable of platooning on a highway; whether they are capable of platooning on non-public roads; whether they are capable of platooning in a particular construction site, mine, forest, etc.; and whether other attributes associated with a vehicle's account allows them to platoon. As should be understood, one or more of these attributes may be used to determine whether a vehicle can platoon with one or more additional vehicles, and whether a vehicle should platoon with one or more additional vehicles. It is contemplated that in some embodiments, a system may rank one or more vehicles with which a vehicle should platoon. In such an embodiment, if a target vehicle (e.g., a vehicle with a high ranking) that a first vehicle attempts to platoon with platoons with second vehicle before the first vehicle is able to platoon with the target vehicle, then the first vehicle may select another (e.g., the next) ranked vehicle that the system would like it to (e.g., determines that it should attempt to) platoon with.

In addition to these factors, other information that a vehicle may transmit and/or receive may include data including, but not limited to data associated with a/an: type of vehicle, vehicle class, vehicle position, latitude, longitude, altitude, heading, speed, longitudinal and lateral acceleration, relative angle, type of load (e.g., type of materials a vehicle is carrying), load (e.g., how a vehicle is loaded and/or where a center of gravity of a vehicle is), a load history (e.g., how a vehicle has been loaded in the past and/or types of loads a vehicle has transported), position in a platoon, historical information of platooning travel, brake status, brake pressure, brake system, version of a brake system, path history, path projection, travel plans, vehicle size, vehicle type, brake type, current operating mode (autonomous or manual), map data, traffic information, GPS augmentation information (e.g., delays from infrastructure), maximum speed, wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, amount of fuel currently being used (e.g, amount of fuel used per amount of time and/or distance), amount of fuel being saved, amount of money being saved by platooning, average amount of money being saved by platooning, historical fuel usage, historical amount of money being saved by platooning, trailer position, current trailer position, past trailer position, tractor type, tractor height, transceiver type, current amount of fuel, previous amount of fuel, vehicle health, next determined/planned stop, projected miles remaining until fuel tanks are empty, malfunctions, turn signals, LIDAR, radar, ultrasonic sensors, road surface, wheel angle, tire pressure, tire tread depth, cabin temperature, engine temperature, trailer interior temperature, camera, fleet of vehicles, NOC that a vehicle can communicate with, computer vision, other vehicle traveling in the same direction, other vehicle traveling in an opposite direction, speed/acceleration/deceleration a vehicle in front of the vehicle is traveling, and intervening traffic (e.g., cut-ins, also referred to as the situation when a vehicle enters an area between a lead vehicle and a rear vehicle causing a dissolve).

It should be understood that, herein, when a system determines acceptable packet loss per distance ratios, that any of these attributes/information/data may be used alone or in combination to determine whether to cause a first vehicle and/or a second vehicle to: (1) start/complete a draw-in portion of a platooning engagement; (2) continue a steady-state portion of a platooning engagement; (3) not start/not complete a draw-in portion of a platooning engagement (an adverse action); and/or (4) enter a dissolve portion of a platooning engagement (an adverse action).

Figure 2:
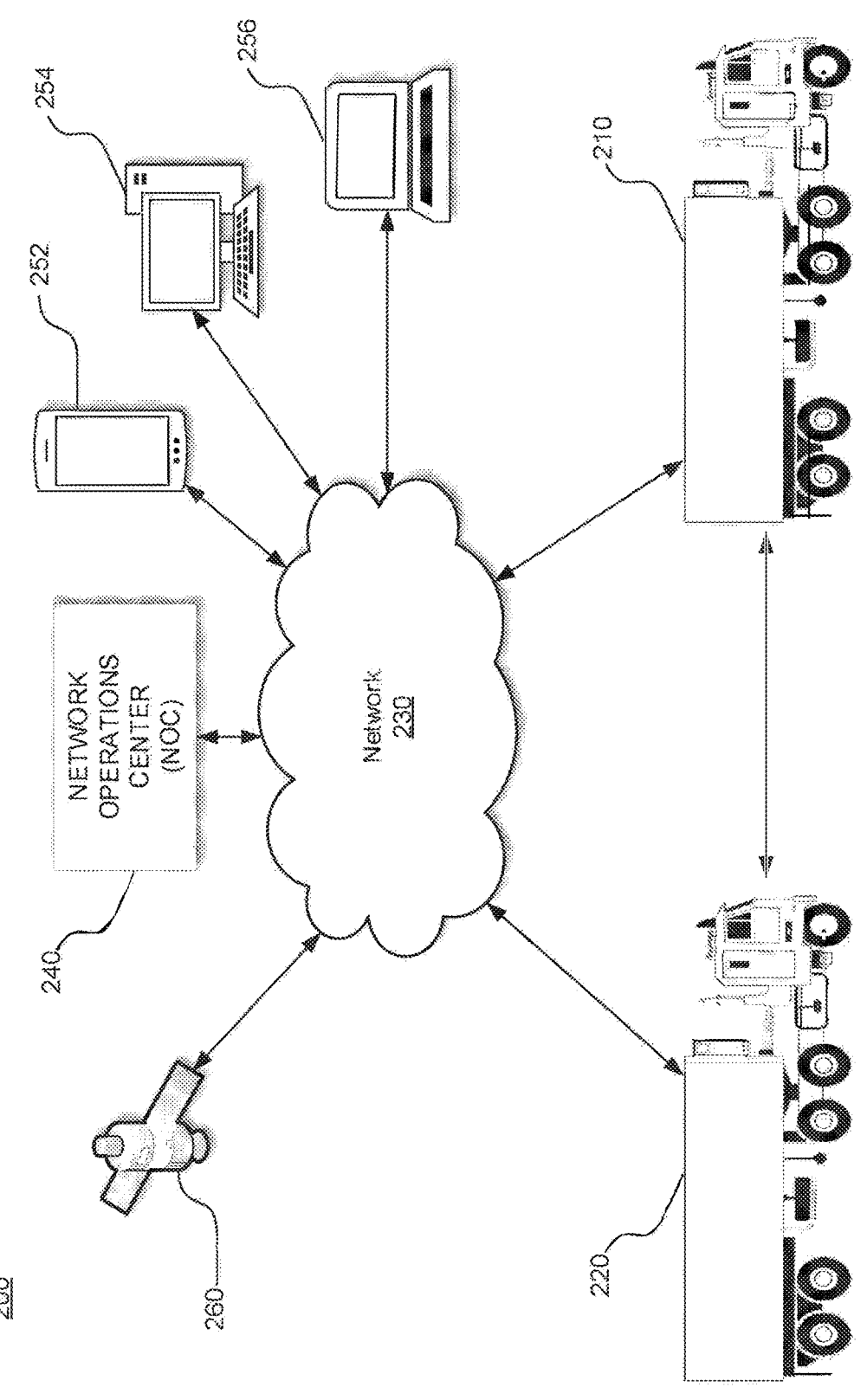
FIG. 2 illustrates a block diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., a NOC may be located in the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
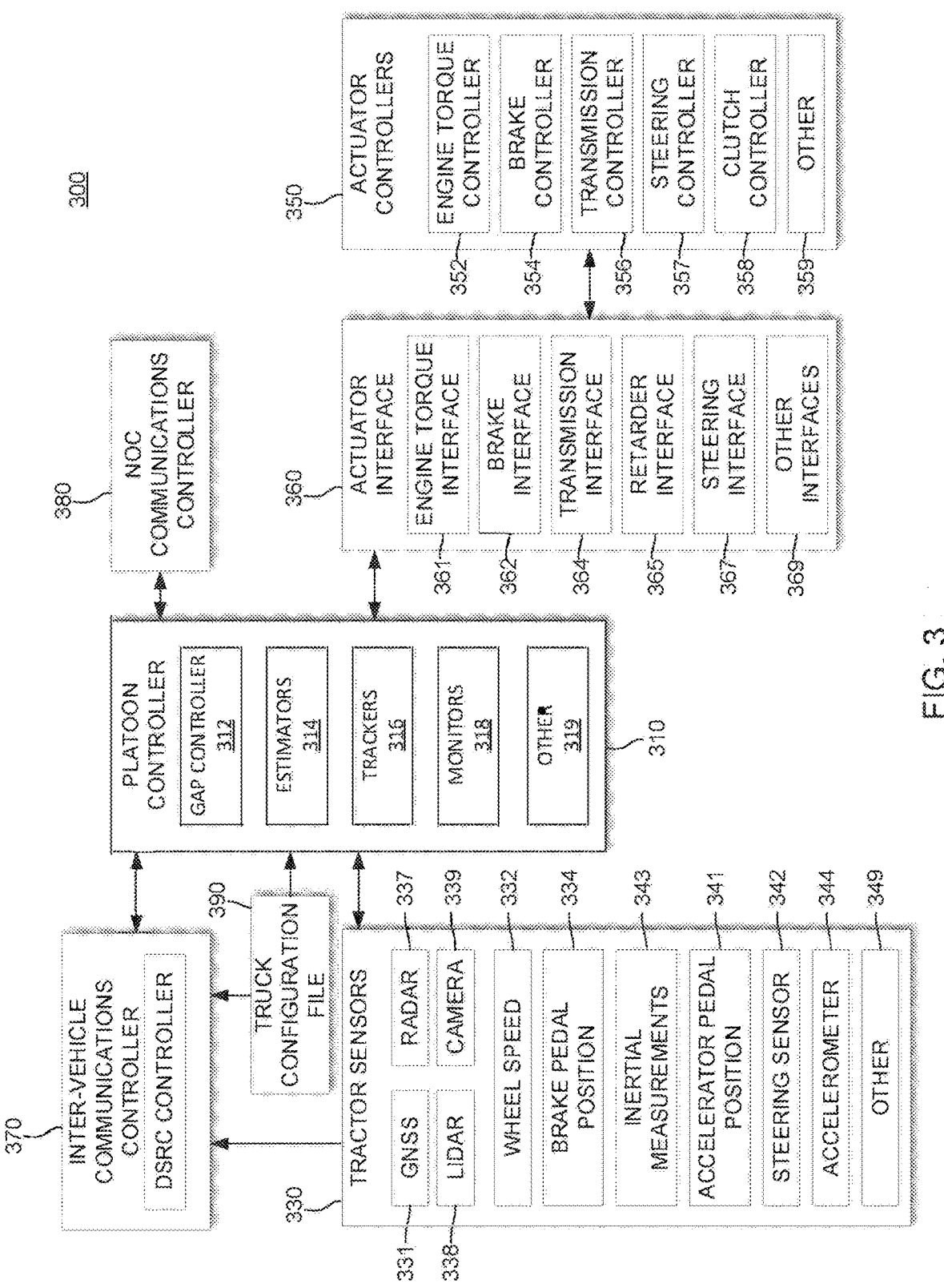
FIG. 3 illustrates a block diagram of a system including an electronic control unit, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder-which may obviate the need for a retarder ECU).

Large trucks and other heavy vehicles frequently have multiple systems for "braking" the truck. These include the traditional brake system assemblies mounted in the wheels of the vehicle-which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation control system (CMS)), or through other or more traditional mechanisms-as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, DSRC networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc. In some embodiments, configuration file 390 may include information about a driver, a fleet, a fleet's schedule, a driver rating, a driver's ability to use the system, whether a vehicle has permission to use a system, whether a vehicle is certified to use the system, etc.

Figure 4A:
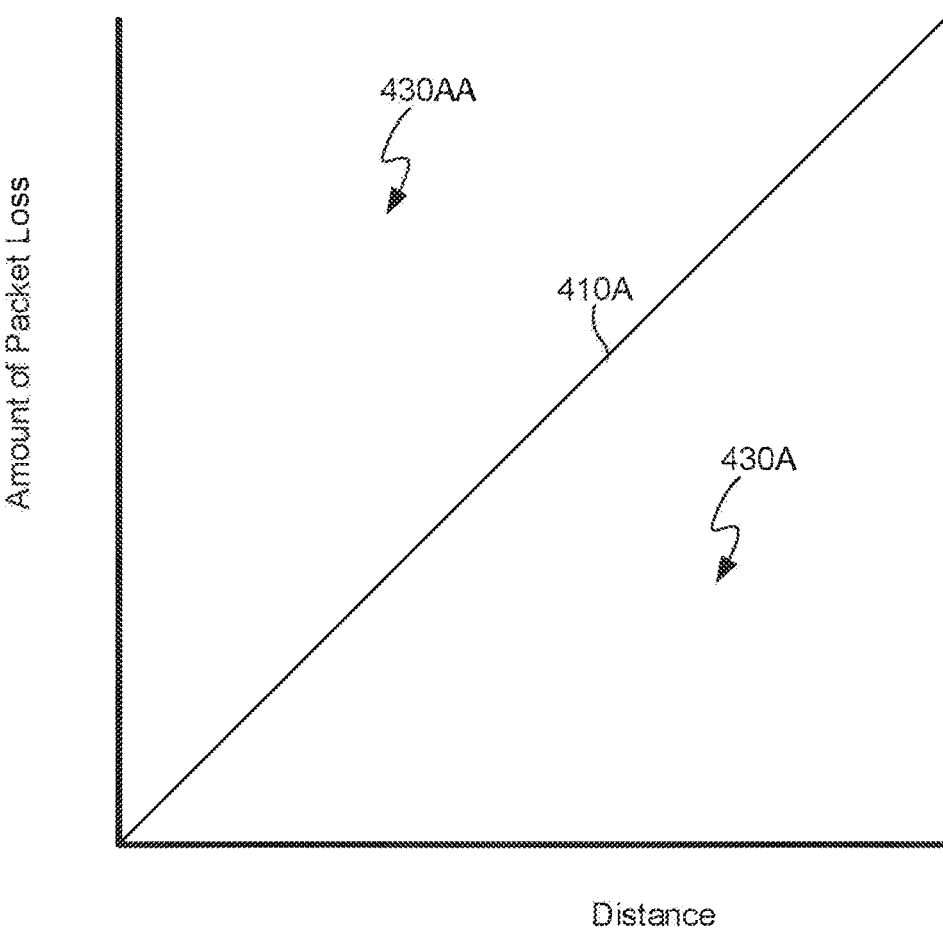
FIGS. 4A-4B illustrate example graphs, in accordance with some embodiments.
Figure 4B:
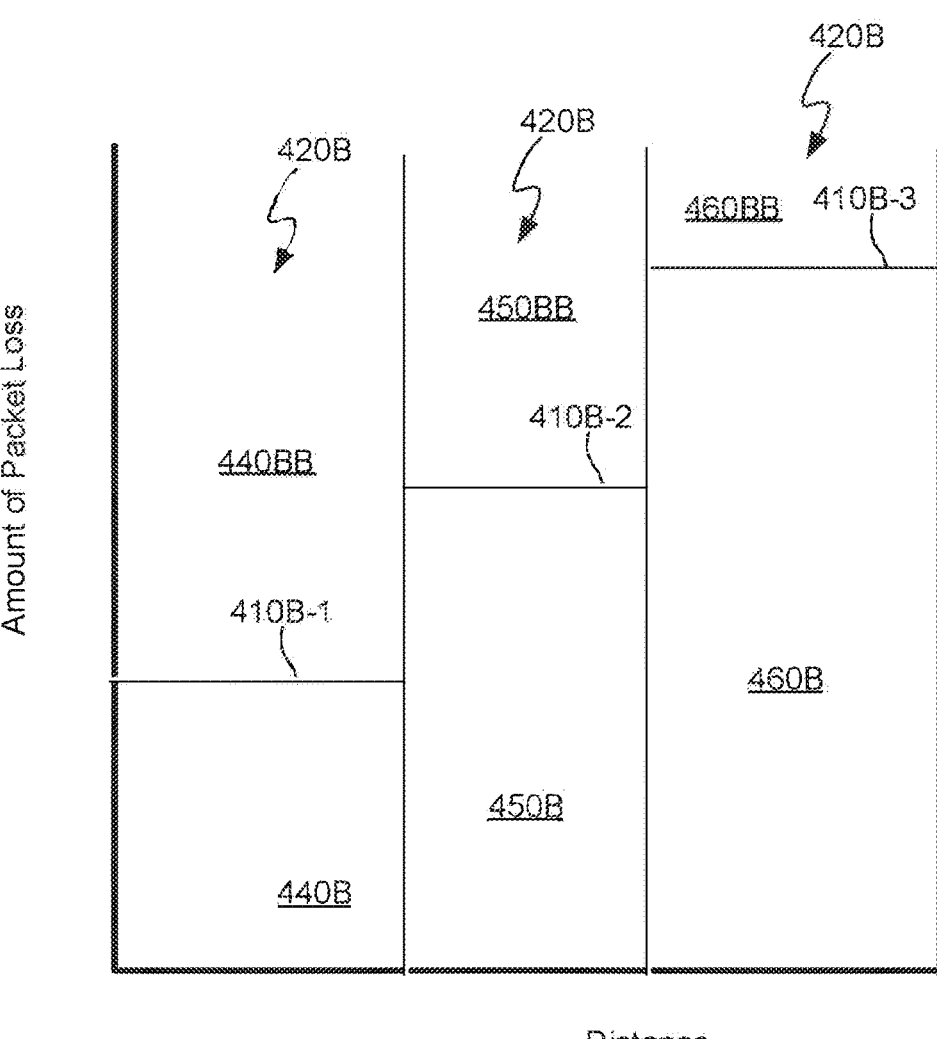

FIGS. 4A-4B illustrate example graphs 400A and 400B, in accordance with some embodiments. Graph 400A illustrates ratios between an amount of packet loss and a distance. In example graph 400A, example line 410A indicates an example ratio below which an acceptable amount of packet loss 430A exists with regard to distance, while the area above line 410A indicates a ratio wherein an unacceptable amount of packet loss 430AA exists, which may cause an adverse action. As can be seen in this simple example graph, as a distance increases, a greater amount of packets may be dropped/lost. Of course, line 410A is shown for the purpose of explanation.

Figure 9A:
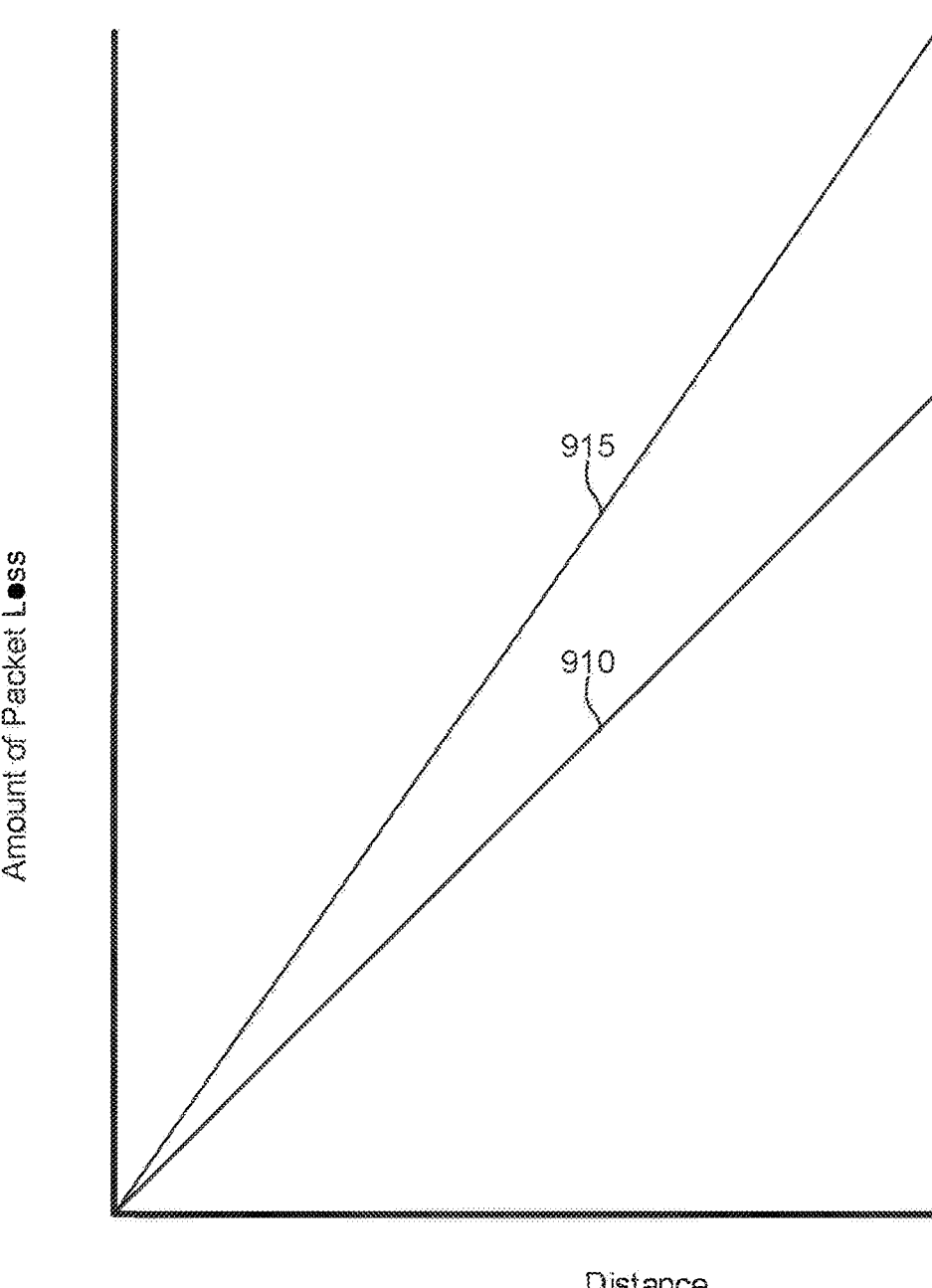
FIGS. 9A-9B illustrate an example graphs, in accordance with some embodiments.

It should be obvious to one skilled in the art that in practice a graph indicating packet loss in comparison to distance would not have a distance of 0 (e.g., line 410A would not go through the origin). Similarly, FIG. 9A is shown for the purpose of explanation.

Example graph 400B illustrates binning, in accordance with some embodiments. As with graph 400A, the area above lines 410B-1, 410B-2, and 410B-3 (e.g., areas 420B) within bins 440B, 450B, and 460B, respectively, indicate that the amount of packet loss with regard to a distance is greater than an acceptable amount, and may lead to an adverse action. Unlike example graph 400A, wherein the formula for determining a threshold amount of packets dropped per distance is linear, example graph 400B has a different threshold for each bin (e.g., gap range). Example graph 400B illustrates example bins that correspond with distances (e.g., 0-10 meters, 10-20 meters, 20+ meters). In such an example, packet loss below line 410B-1 (which may correspond with a 0-10 meter gap) is acceptable, packet loss below line 410B-2 (which may correspond with a 10-20 meter gap) is acceptable, and packet loss below line 410B-3 (which may correspond with a gap over 20 meters) is acceptable. Conversely, in various embodiments area 440BB above line 410B-1 (which may correspond with a 0-10 meter gap) may indicate that an unacceptable amount of packets are being lost for the distance (or headway, as should be understood) associated with that bin. Similarly, areas 450BB and 460BB (which may correspond to a bin for a gap between 10 and 20 meters and a bin greater than 20 meters, respectively) may have a packet loss rate that is unacceptable for that particular bin, and at which may cause an adverse action.

Figure 5A:
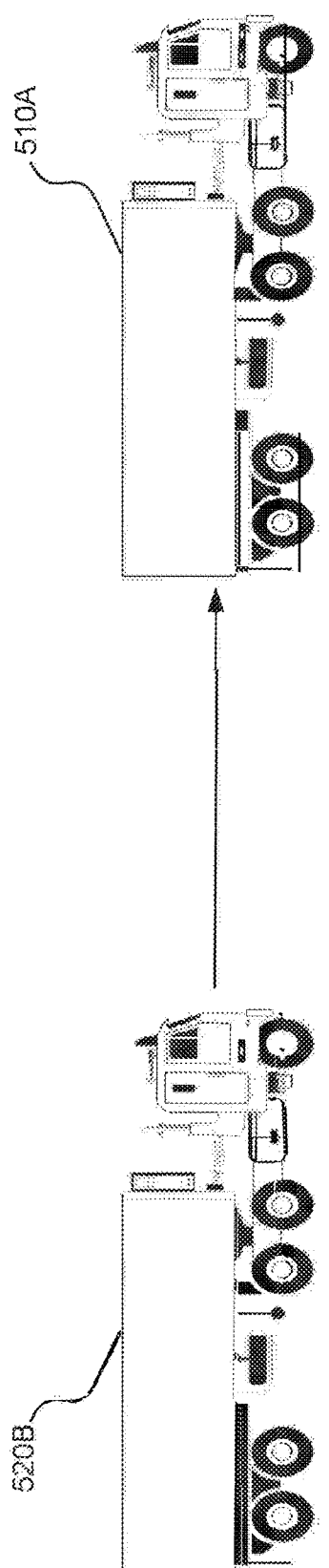
FIGS. 5A-5B illustrate example vehicles, in accordance with some embodiments.
Figure 5B:
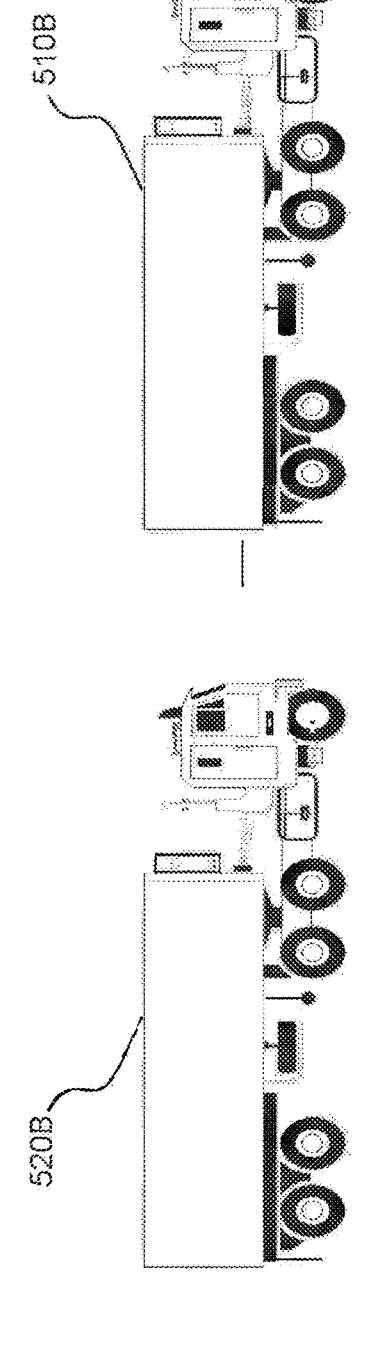

FIGS. 5A-5B illustrate example vehicles, in accordance with some embodiments. In example FIG. 5A, vehicles 510A and 510B are beginning a platooning engagement (e.g., vehicle 510B is drawing-in). In some embodiments, once a draw-in portion of a platooning engagement is complete, as shown in FIG. 5B, vehicles 510B and 520B may travel in a steady-state portion of a platooning engagement (e.g., wherein a gap is substantially maintained). In various embodiments, if an amount of packet loss is too great during the draw-in or steady-state portions of a platooning engagement an adverse action may occur (e.g., a draw-in may be averted/disallowed/prevented or a steady-state may end).

It should be understood by one skilled in the art that descriptions herein regarding various behaviors in response to packet loss or other miscommunication may apply to technologies other than/in addition to platooning. For example, systems included in passenger cars may make a variety of decisions (e.g., to provide more control to a driver) in response to an amount of disturbance (e.g., packet loss, corrupt packages, untrusted packages). In various embodiments described herein, decisions may be made by any vehicle, whether following another vehicle or not, based on information or a lack thereof received from another vehicle (which the vehicle may be following).

Figure 6A:
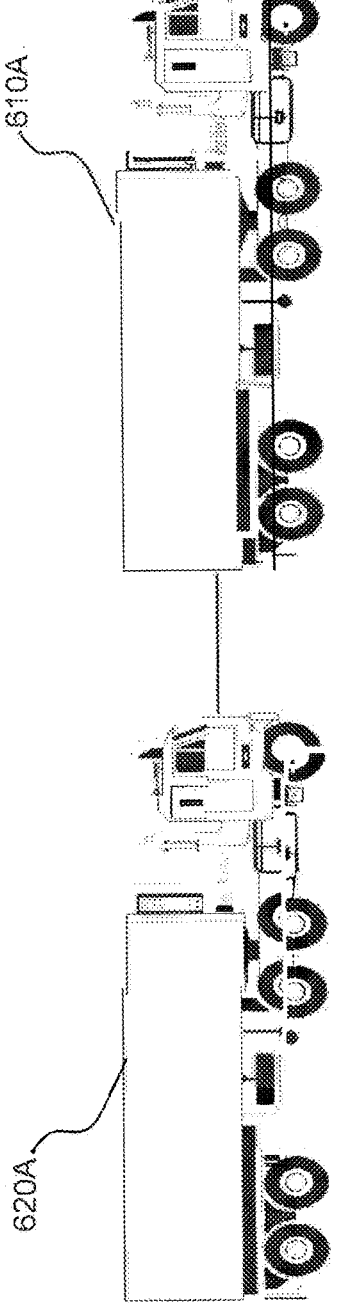
FIGS. 6A-6B illustrate example vehicles, in accordance with some embodiments.
Figure 6B:
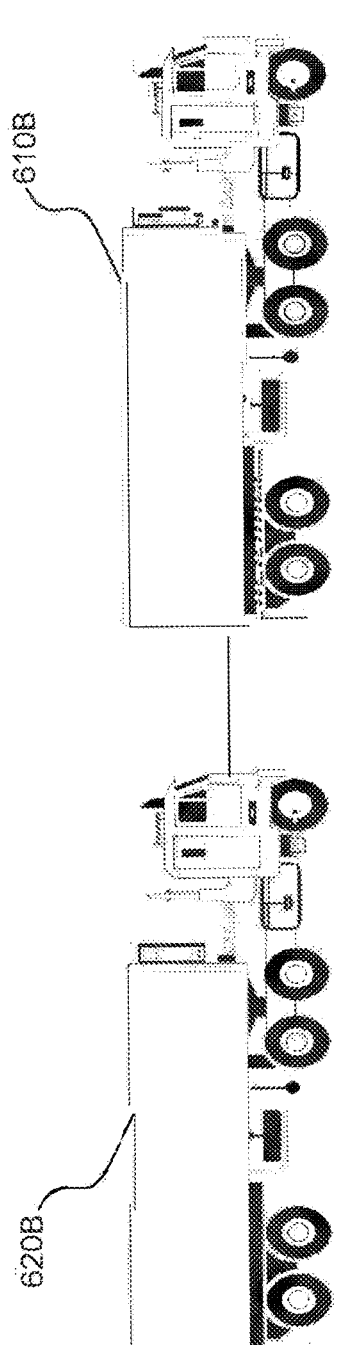

FIGS. 6A-6B illustrate example vehicles, in accordance with some embodiments. In example FIG. 6A, vehicles 610A and 620A are traveling in a steady-state portion of a platooning engagement, which may also be referred to as "platooning", in some embodiments. In this portion of a platooning engagement, a gap is maintained (or at least substantially maintained (e.g., +/−1, 2, 3, 4 meters). So long as an amount of packets are not dropped, a platooning engagement may continue from FIG. 6A to FIG. 6B—e.g., the steady-state portion of a platooning engagement may continue. As shown, vehicles 610B and 620B may continue platooning.

Figure 7A:
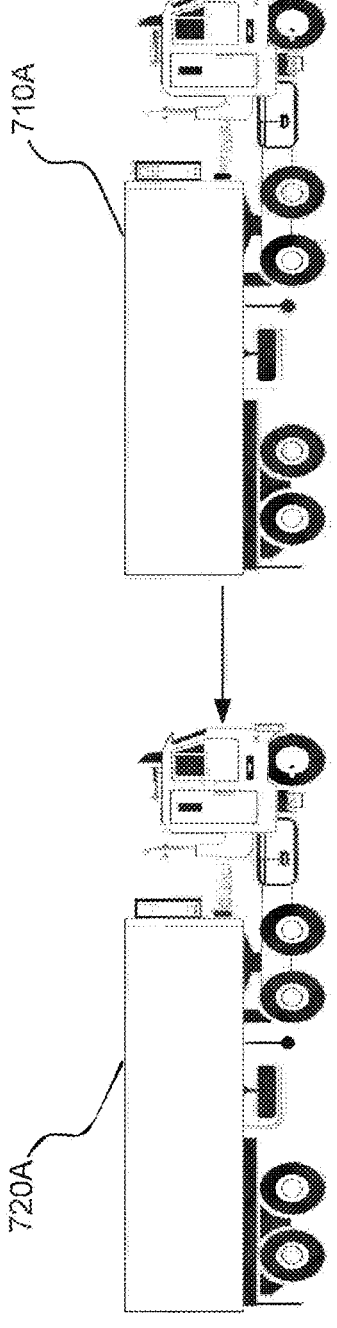
FIGS. 7A-7B illustrate example vehicles, in accordance with some embodiments.
Figure 7A:
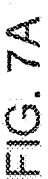
Figure 7B:
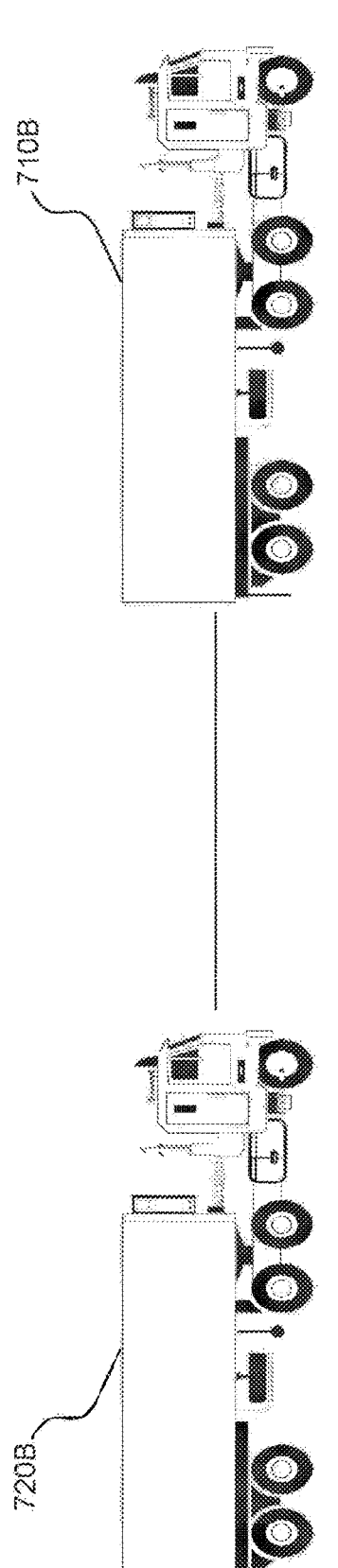

FIGS. 7A-7B illustrate example vehicles, in accordance with some embodiments. FIG. 7A illustrates vehicles 710A and 720A that are ending a steady-state portion of a platooning engagement, which may be referred to as a dissolve or dissolving a platoon. Such a dissolve may be considered an adverse action, and may occur when a threshold amount of packets are being lost with respect to the size of a gap between vehicles 710A and 710B. After a dissolve occurs, vehicles 710B and 720B may be operating in a state where platooning is not engaged. In some embodiments, after a dissolve due to a threshold amount of packet loss being reached, in response to a threshold amount of packets being received by a rear vehicle, a platooning engagement may automatically recur, and a draw-in may begin.

Figure 8:
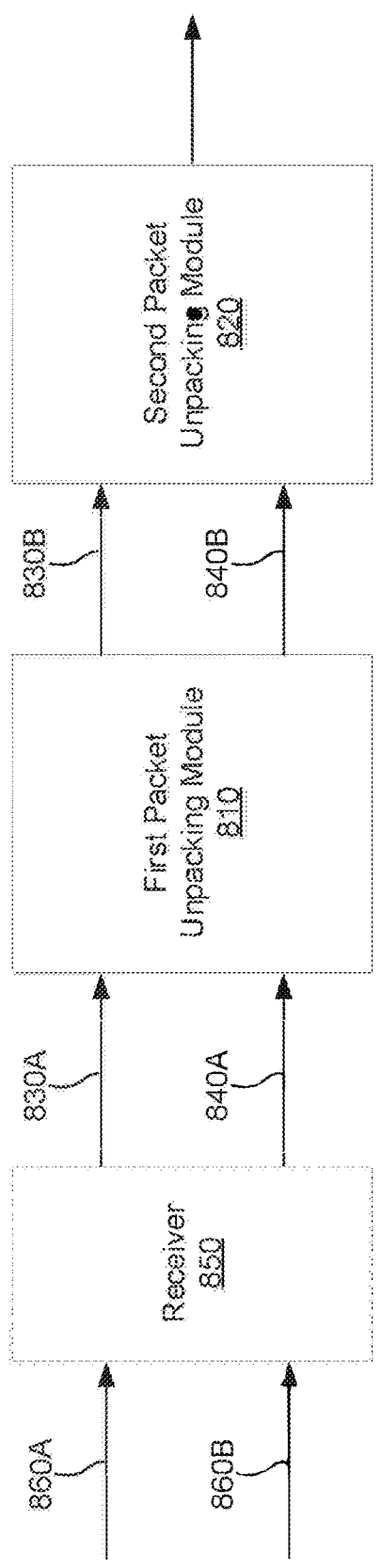
FIG. 8 illustrates example modules, in accordance with some embodiments.

FIG. 8 illustrates example modules, in accordance with some embodiments. In one or more embodiments one or more streams of packets 830A and 840A may be received by a first packet unpacking module 810. Further, one or more streams of packets 830B and 840B may be received by a second packet unpacking module 820. In some embodiments, packets may be received by first packet unpacking module 810, and packets that are at least partially unpacked may be sent to second packet unpacking module 820. Of course, it should be understood that an optional receiver 850 may receive data including streams of packets 860A and 860B (which may be 830A and 830B). In some embodiments, optional receiver 850 may receive a single stream of packets (e.g., data), and separate data as appropriate (e.g., separate one data stream into multiple data streams).

In some embodiments, both first packet unpacking module 810 and second packet unpacking module 820 may receive an amount of gap (e.g., a distance between a front and rear vehicle) and/or an amount of packet loss. In some embodiments, information indicating an amount of gap may be included in packet streams 830A and 830B, and information indicating amounts of packet loss may be included in packet streams 840A and 840B.

In some embodiments, first packet unpacking module may determine whether an adverse action should occur based on a size of a gap and an acceptable amount of packet loss. As described herein, a size of a gap may be represented by a bin, such that if a gap is within a first range (e.g., a first bin), a particular amount of packet loss is acceptable while if the gap is within a second, different range (e.g., a second bin), a different amount of packet loss may be acceptable.

In various embodiments, second packet unpacking module 820 may perform the same and/or similar operations as first packet unpacking module 810. For instance, second packet unpacking module 820 may determine whether an adverse action should occur based on a distance and an amount of packet loss. In some embodiments, an acceptable amount of packet loss vis-√†-vis distance may be the same, or different in second packet unpacking module 820 compared to first packet unpacking module 810. For example, first packet unpacking module 810 may allow for a linear formula as shown in FIG. 4A, or have 4, 5, 6, or 7 bins. In some embodiments, an amount of bins and/or an amount of acceptable packet loss may be based at least in part on whether the received packets are safety critical (e.g., associated with the braking of a front vehicle) or non-safety critical. In some embodiments, first packet unpacking module 810 may determine an amount of safety-critical packet loss while second packet unpacking module 820 may determine an amount of non-safety critical packet loss. In such an example, either first packet unpacking module 810 and/or second packet unpacking module 820 may cause an adverse action, including when the amount of packet loss in comparison to a gap size is the same (as it typically is). In some embodiments first packet unpacking module 810 and second packet unpacking module 820 may be located on different chips, in different PECUs, etc.

FIG. 9 illustrates an example graph 900A, in accordance with some embodiments. Example graph 900A includes two lines 910 and 915. Example graph 900A illustrates two lines at which an adverse actions may occur when there are more than one modules that determine whether an adverse action should occur based on a gap in comparison with an amount of packet loss (e.g., a distance to packet loss ratio). For example, adverse actions may occur when an amount of packet loss compared with a distance is below line 910 (e.g., when the packet loss includes at least a portion of safety critical packets (or vice versa (non-safety-critical packets)), and adverse actions may also occur when an amount of packet loss compared with a distance is below line 915 (e.g., when the packet loss includes at least a portion of non-safety critical packets (or vice versa (safety-critical packets)). As shown in example graph 900A, a distance between two vehicles may not be as far (e.g., a gap may not be as large) in order to cause an adverse action if the packets are safety critical (or vice versa).

Of course, the same principles applied in FIG. 4B may apply to FIG. 9, wherein the formula to determine whether an adverse action should occur is not linear, but instead distance ranges are split into bins. In such cases, a line that is lower in a given bin may be associated with safety-critical packets, while a line that is higher in a given bin may be associated with non-safety-critical packets (or vice versa).

Figure 9B:
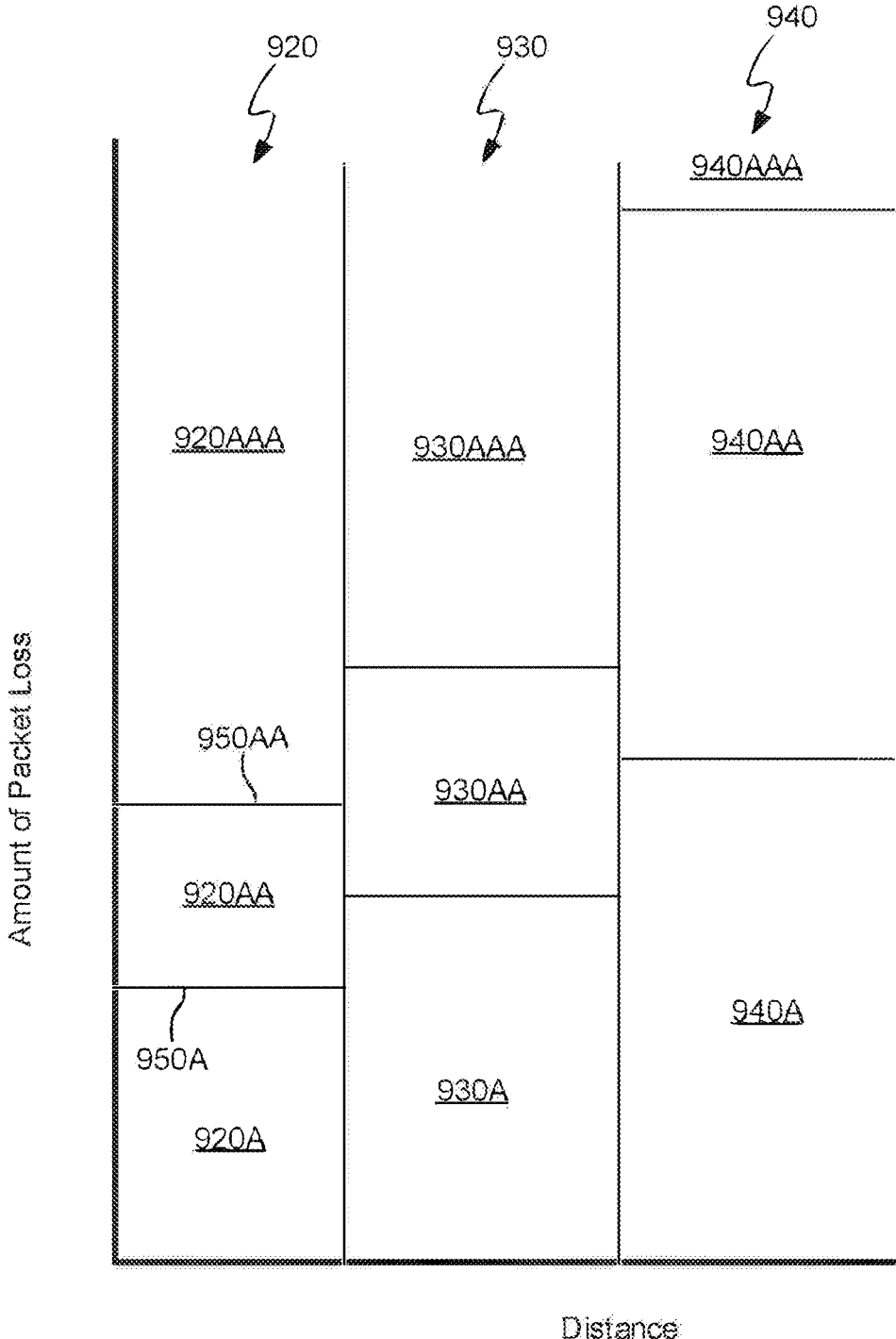

Such an example may be seen in FIG. 9B.

FIG. 9B illustrates an example graph 900B comparing distance to an amount of packet loss. Example graph 900B includes three bins (e.g., distance ranges) 920, 930, and 940. Bin 920 includes an area indicative of a gap/headway/distance between vehicles that is small, bin 930 includes an area indicative of a gap/headway/distance between vehicles that is larger than bin 920, and bin 940 includes an area indicative of a gap/headway/distance between vehicles that is larger than bin 930. As such, systems and methods described herein may accept dropping a greater amount of packets if a gap falls within bin 940 as opposed to 920 (where a gap is small).

Graph 900B shows areas where an amount of packet loss is acceptable (e.g., does not cause an adverse action) to a first module, a second module, or both. For instance, a first module may allow for a packet loss/distance ratio below line 950A (e.g., area 920A) and a second module may allow for a packet loss/distance ratio below line 950AA (e.g., areas 920A and 920AA). In this example, area 920AAA, above both lines 950A and 950AA is indicative of a packet loss/distance ratio that would cause both modules to initiate an adverse action. Bins 930 and 940 illustrate similar scenarios but with bins indicative of larger gaps.

For example, area 930A may be acceptable to a first module while areas 930A and 930AA may be acceptable to a second module. Area 930AAA may not be acceptable to either module, and if a packet loss/distance ratio is in this section either, or both modules may cause an adverse action.

Similarly, in example bin 940, area 940A may be acceptable to a first module, while areas 940AA and 940A may be acceptable to a second module. Here, area 940AAA may not be acceptable to either a first or a second module and either module may cause an adverse action.

Figure 10A:
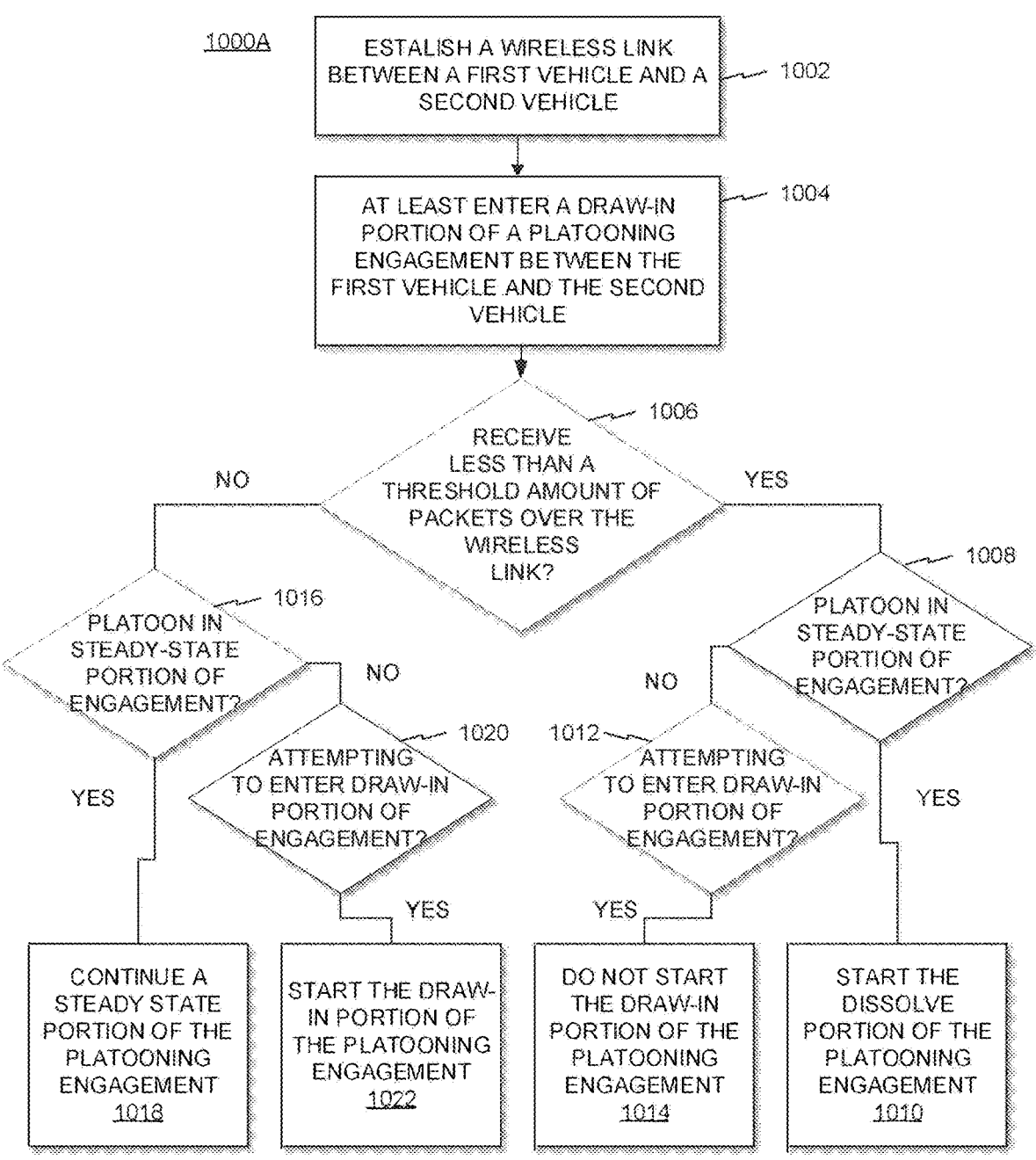
FIGS. 10A-10B illustrate an example flowcharts, in accordance with some embodiments.

FIG. 10A illustrates a flowchart of an example process 1000A, in accordance with some embodiments. Example process 1000A includes a method for managing platoonable vehicles, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 10A should not be construed as limiting the scope of the invention. In one or more embodiments, the steps of FIG. 10A can be performed by example systems 100, 200, 300, and/or computing system 1100.

In step 1002, a wireless link is established between a first vehicle and a second vehicle. This link may be DSRC, cellular, WiFi, ZigBee, or any other acceptable protocol.

In step 1004, at least a draw-in portion of a platooning engagement is entered between at least a first and a second vehicle. During a draw-in portion of an engagement, a gap is decreased between a rear vehicle and a front vehicle, typically by the rear vehicle increasing its speed.

In step 1006, a determination is made based on whether less than a threshold amount of packets is received over the wireless link. Packets may be crucial to a platooning system.

In some cases, a system may be unsafe if a proper amount of packets are not transmitted and received as desired.

If less than a threshold amount of packets are received, in step 1008, a determination is made as to whether the platoon engagement is in a steady state. Based on its state, various actions may be performed.

If a platoon engagement is in a steady state, and less than a threshold amount of packets are received over the wireless link, then in step 1010 a dissolve portion of a platooning engagement occurs (e.g., starts). In some cases, this ends the platooning engagement.

If at step 1008 a determination is made that a platoon is not in a steady state, and less than a threshold amount of packets are received over the wireless link, then in step 1012 a determination is made as to whether a platoon is in a draw-in portion (or attempting to start/enter a draw-in portion) of a platooning engagement.

If the platooning engagement is in a draw-in portion (or attempting to start/enter a draw-in portion), and less than a threshold amount of packets are received over the wireless link, then in step 1014 a draw-in portion of a platooning engagement will not be completed (or not started/entered).

On the other hand, if more than a threshold amount of packets is received over a wireless link at step 1006, then a determination may be made at step 1016 as to whether the platoon is in a steady-state portion of an engagement. In various embodiments, receiving more or less than a threshold amount of packets may refer to an amount of packets over time, a percentage of packets over one or more portions of time, etc.

If the platoon is in a steady-state portion of a platooning engagement at step 1016, process 1000A may move to step 1018 and continue a steady-state portion of a platooning engagement.

If the platoon is not in a steady-state portion of a platooning engagement at step 1016, process 1000A may move to step 1020 and determine whether a platoon is in a draw-in portion of a platooning engagement (or attempting to start/enter a draw in portion of a platooning engagement). If a determination is made that the platoon is in a draw-in portion (or starting/entering a draw-in portion) of a platooning engagement, the process 1000A may proceed to step 1022 and continue (or start/enter) the draw-in portion of the platooning engagement, which will typically end in the platoon entering a steady-state portion of a platooning engagement.

Figure 10B:
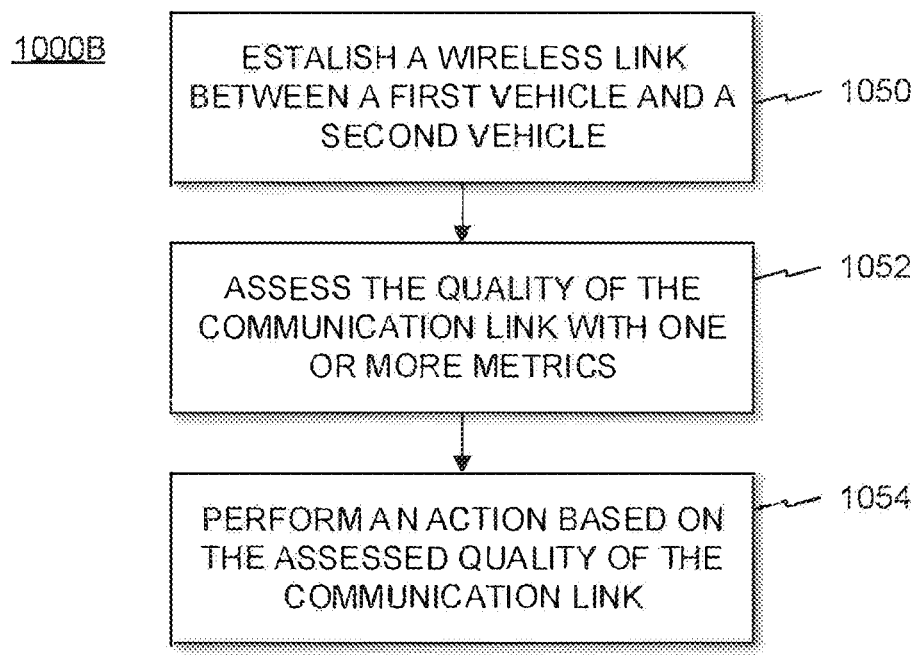

FIG. 10B illustrates a flowchart of an example process 1000B, in accordance with some embodiments. Example process 1000B includes a method for managing vehicles (whether platoonable or otherwise), in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 10B should not be construed as limiting the scope of the invention. In one or more embodiments, the steps of FIG. 10B can be performed by example systems 100, 200, 300, and/or computing system 1100.

In step 1050 a wireless link is established between a first vehicle and a second vehicle. This link may transmit data using DSRC, cellular, WiFi, ZigBee, or any other acceptable protocol.

In step 1052 the quality of the communication link is assessed using one or more metrics. The metrics may include an amount of dropped packets, the integrity of received packets, whether received packets are corrupt, whether received packets appear to be secure, etc.

In step 1054 an action is performed based on the assessed quality of the communication link. For example, a vehicle may provide more control to a driver, a vehicle may stop platooning, a vehicle may slow or stop, a vehicle may pull over on a road, etc. Of course, if the quality is above a threshold (e.g., based on the one or more metrics) an action may be to continue moving at a particular speed, accelerate, decrease an amount of control a driver has over the vehicle, etc. It should be understood that in this general scenario virtually any action may be performed by a vehicle in response to an assessed quality of a communication link.

Figure 11:
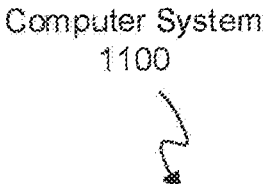
FIG. 11 illustrates an example computing system, in accordance with some embodiments.

FIG. 11 illustrates an example computing system, in accordance with some embodiments.

In various embodiments, the calculations performed above may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

For example, as shown in FIG. 11, example computing system 1100 may include one or more computer processor(s) 1102, associated memory 1104 (e.g., random access memory (RAM), cache memory, flash memory, read only memory (ROM), electrically erasable programmable ROM (EE-PROM), or any other medium that can be used to store the desired information and that can be accessed to retrieve that information, etc.), one or more storage device(s) 1106 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 1102 may be an integrated circuit for processing instructions. For example, the computer processor(s) may be one or more cores or micro-cores of a processor. The computing system 1100 may also include one or more input device(s) 1110, such as a touchscreen, keyboard, mouse, microphone, touchpad, electronic pen, or any other type of input device. Further, the computing system 1100 may include one or more output device(s) 1108, such as a screen (e.g., a liquid crystal display (LCD), a plasma display, touchscreen, cathode ray tube (CRT) monitor, projector, or other display device), a printer, external storage, or any other output device. The computing system 1100 may be connected to a network 1114 (e.g., a local area network (LAN), a wide area network (WAN) such as the Internet, mobile network, or any other type of network) via a network interface connection 1118. The input and output device(s)

may be locally or remotely connected (e.g., via the network 1112) to the computer processor(s) 1102, memory 1104, and storage device(s) 1106.

One or more elements of the aforementioned computing system 1100 may be located at a remote location and connected to the other elements over a network 1114. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for managing platoonable vehicles comprising:

establishing a communication link between a first vehicle and a second vehicle;

attempting to start a platooning engagement between the first vehicle and the second vehicle;

receiving either at least a or less than a threshold amount of packets per a period of time over the communication link, wherein:

the threshold amount of packets is based at least in part on a gap between the first vehicle and the second vehicle, and the packets are safety critical;

in response to receiving at least the threshold amount of packets per a period of time over the communication link:

(1) causing the first vehicle and the second vehicle to start the platooning engagement; or (2) continuing a steady state portion of the platooning engagement; and in response to receiving less than the threshold amount of packets per a period of time over the communication link:

(1) causing the first vehicle and the second vehicle to not start the platooning engagement; or (2) starting the dissolve portion of the platooning engagement.

2. The method of claim 1, wherein the threshold amount of packets includes a threshold amount of non-corrupt packets.

3. The method of claim 1, wherein the communication link is one of a plurality of communication links between the first vehicle and the second vehicle.

4. A method for managing platoonable vehicles comprising:

transmitting data packets over a communication link between a first vehicle and a second vehicle; and performing an action in response to receiving:

(1) less than a threshold amount of data packets per an amount of time over the communication link;

(2) data packets at a rate below a threshold rate over the communication link; or (3) data packets with a latency below a threshold latency over the communication link, wherein the threshold amount of packets and the threshold rate are based at least in part on a gap between the first vehicle and the second vehicle, and wherein the packets are safety critical.

5. The method of claim 4, wherein the action performed includes one or more of:

(1) causing the first vehicle and the second vehicle to not start a platooning engagement; or (2) starting a dissolve portion of the platooning engagement.

6. The method of claim 4, wherein the threshold amount of data packets per an amount of time is based at least in part on a gap between the first vehicle and the second vehicle.

7. The method of claim 4, wherein the threshold latency is based at least in part on a gap between the first vehicle and the second vehicle.

8. A method for managing platoonable vehicles comprising:

establishing a communication link between a first vehicle and a second vehicle;

attempting to start a platooning engagement between the first vehicle and the second vehicle;

receiving either a first amount of packets per an amount of time over the communication link at a first location or a second amount of packets per an amount of time over the communication link at a second location, wherein:

the first and second amounts of packets are based at least in part on a gap between the first vehicle and the second vehicle, and the packets are safety critical;

in response to receiving the first amount of packets per an amount of time over the communication link at the first location, causing a first action to occur including:

(1) causing the first vehicle and the second vehicle to start the platooning engagement;

(2) continuing a steady state portion of the platooning engagement;

(3) causing the first vehicle and the second vehicle to not start the platooning engagement; or (4) starting a dissolve portion of the platooning engagement; and in response to receiving the second amount of packets per an amount of time over the communication link at the second location, causing a second action to occur including:

(1) causing the first vehicle and the second vehicle to start the platooning engagement;

(2) continuing a steady state portion of the platooning engagement;

(3) causing the first vehicle and the second vehicle to not start the platooning engagement; or (4) starting the dissolve portion of the platooning engagement.

9. The method of claim 8, wherein the first amount of packets and the second amount of packets are the same amount of packets.

10. The method of claim 8, wherein the second amount of packets is greater than the first amount of packets.

11. The method of claim 8, wherein the first location is at a first ECU, and wherein the second location is at a second ECU.

12. The method of claim 8, wherein the first location is at a first chip, and wherein the second location is at a second chip.

13. The method of claim 12, wherein the second location is configured to unpack packets that are safety critical.

14. The method of claim 12, wherein the first location is configured to unpack packets that are not safety critical.

* * * * *